Aug. 7, 1951             L. JOFEH             2,563,245

VOLTAGE COMBINING CIRCUITS

Filed May 7, 1945

INVENTOR.
LIONEL JOFEH
BY Ralph B. Stewart
Attorney

Patented Aug. 7, 1951

2,563,245

UNITED STATES PATENT OFFICE 2,563,245

VOLTAGE COMBINING CIRCUITS

Lionel Jofeh, London, England, assignor to A. C. Cossor Limited, London, England, a British company Application May 7, 1945, Serial No. 592,417
In Great Britain May 12, 1944

7 Claims. (Cl. 179—171)

This invention relates to electrical circuits.

The invention is concerned with a circuit for producing an output voltage relative to a point of fixed potential, the variations of which are at all times equal, or approximately equal, to those of an input voltage between two points both of variable potential. Where the input voltage is a fluctuating voltage having in addition to a purely alternating component a direct voltage component, it may be required either to retain or to remove the direct component from the output voltage.

An example of the aforesaid requirement is the provision of an output voltage for application to two deflector plates of a cathode ray tube one of the deflector plates being earthed, and the output voltage being required to be substantially proportional to the difference between the voltages provided by two sources each of which has one terminal earthed. A further example is the elimination of a high-tension ripple voltage from the output of an amplifier.

The principal object of the invention is to provide an improved circuit whereby the aforesaid requirements can be met, even if the voltage variations are of very low frequency.

In carrying the invention into effect, one of the two points of variable potential may be connected to the input of an amplifier, and the output of the amplifier which is arranged to be opposite in phase with the input thereto, may be connected through an impedance to the other of the two points of variable potential. The required voltage is then obtained between a point of fixed potential and a tapping on this impedance so selected that approximately unity gain is there obtained from the amplifier.

Figure 1:
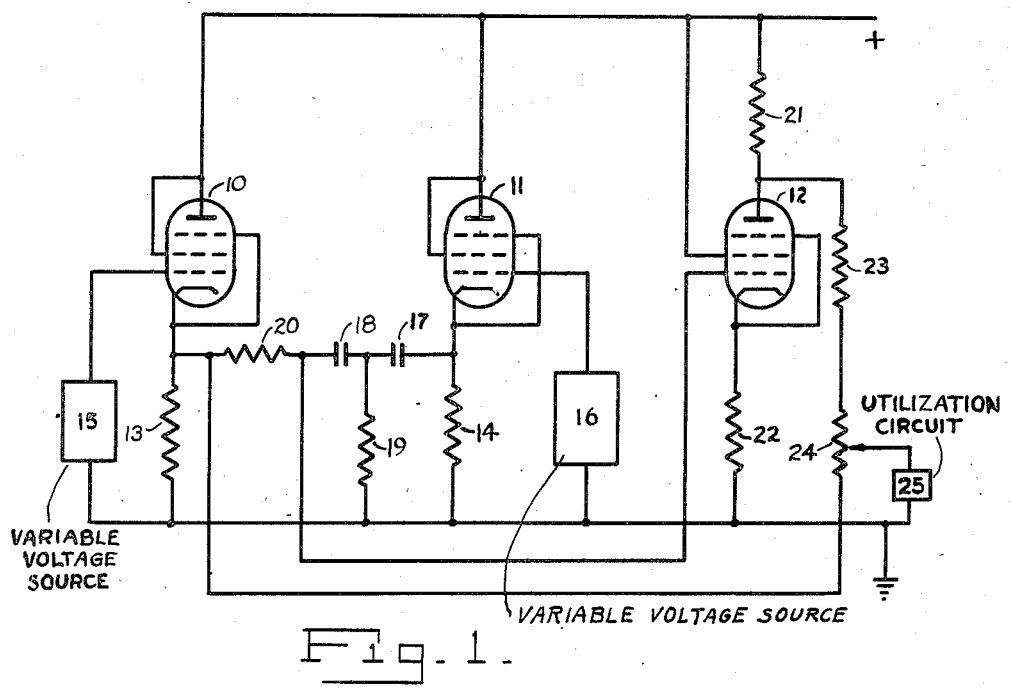
Figure 2:
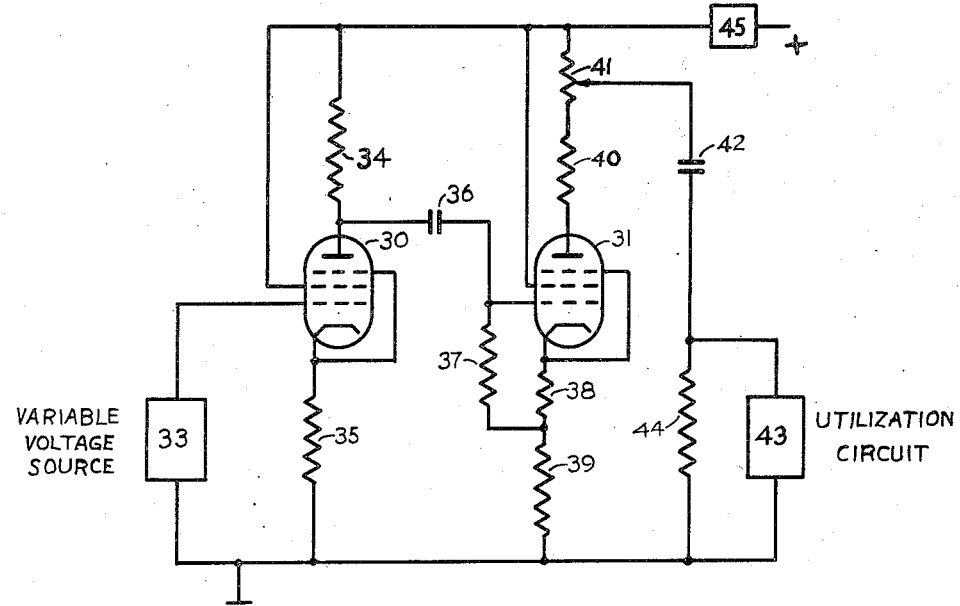

The accompanying drawing shows circuit diagrams of two arrangements embodying the invention. Figure 1 shows part of an electrical calculating apparatus, the purpose of which is to serve as an electrical analogue of a complex mechanical system, for the purpose of analysing the behaviour thereof under varying conditions. Figure 2 shows an amplifier for alternating voltages in which the invention is applied for the purpose of eliminating from the output any spurious voltages due to ripple in the high tension supply.

In the circuit shown in Figure 1, the valves 10, 11, 12 are all pentodes of the Mullard Radio Valve Company's EF.50 type, operating with anode and screen high tension supplies of 300 volts. Valves 10 and 11 both operate as cathode followers with cathode loads 13 and 14, each of 10 kilohms, and with no anode loads.

Two independently varying voltages, both having components of frequencies up to the order of a few hundred cycles and both also containing direct components, are applied from sources 15 and 16 as inputs to valves 10 and 11 respectively. The output voltages developed across cathode load resistors 13 and 14 are applied from opposite ends to an impedance network comprising condensers 17 and 18 of capacities 0.01 and 0.1 microfarad respectively and resistors 19 and 20 of 25 and 2 kilohms respectively.

The invention is applied to this circuit for the purpose of producing a voltage relative to earth, the variations of which are at all times proportional to, and almost equal to, those of the voltage developed across resistor 20, without loss of the direct component. This may be required, for example, for application to further circuits forming part of the calculating apparatus, or for application between deflector plates of a cathode ray tube, one of which is permanently earthed.

The right-hand end of resistor 20 is connected to the input of a direct-coupled amplifier comprising pentode 12. This pentode has an anode load resistor 21 of 30 kilohms and a cathode load resistor 22 of 12 kilohms. The latter provides a substantial measure of degenerative feedback. The output circuit from the anode also includes a feedback path to the left-hand end of resistor 20, this path comprising resistor 23 of 500 kilohms and potentiometer 24 of 300 kilohms. The complete feedback path to earth includes, also in series, the output impedance of the cathode follower amplifier comprising valve 10. This impedance, being approximately the reciprocal of the mutual conductance of valve 10, and therefore having a value of about 250 ohms, is small relative to the resistances 23 and 24.

The output is taken between earth and the slider of potentiometer 24, and is applied to a utilization circuit 25.

During the initial setting-up of the circuit, resistor 20 is temporarily short-circuited and an alternating voltage (say, a 50-cycle voltage) is injected in place of source 15. The grid of valve 11 is temporarily earthed. The slider of potentiometer 24 is then adjusted until minimum alternating voltage output is obtained across circuit 25. The amplifier comprising valve 12 and its feed-back circuit 23, 24 will then be giving nearly unity gain at the slider of potentiometer 24. When the circuit has been adjusted thus, the output voltage across circuit 25 will vary at all times in proportion with the voltage across resistor 20. The direct component of the voltage across resistor 20 is represented in the output voltage across circuit 25 as well as the alternating components, but an additional direct component will also be superposed.

If the gain of the amplifier comprising valve 12 were large, the tapping point required on the feedback path would be that corresponding to unity gain. In practice, however, in order to obtain linearity of amplification, it is preferred to provide a substantial measure of degeneration by other means than the feedback path to the left-hand end of resistor 20; such other means is shown as cathode resistor 22. The precise value of gain at the tapping on the feedback path, i. e. the slider of potentiometer 24, is $A/(A+1)$ where A is the effective gain of amplifier at the point, namely the anode of valve 12, from which the feedback path is taken. The output voltage developed between this tapping and earth is then a representation of that across resistor 20 on a slightly reduced scale, namely the scale $A/(A+1)$.

In the circuit shown in Figure 2, the valves 30, 31 are again both pentodes of the EF.50 type, and are operated with anode and screen high tension supplies of 250 volts.

The valve 30 is arranged as a conventional amplifier with a variable voltage input from source 33 and with anode and cathode loads consisting of resistors 34 and 35 of 33 kilohms and 560 ohms respectively. The latter is not by-passed and therefore provides a small degree of negative feedback.

The true output of this amplifier is the voltage developed across anode resistor 34. The potential of the anode, however, contains, superposed upon this, the ripple voltage of the positive line. The invention is applied to develop an output voltage to earth, the variations of which are at all times equal to those of the voltage appearing across resistor 34, but which are independent of the absolute potentials of the extremities of resistor 34.

The lower end of resistor 34 is conventionally coupled, through condenser 36 of 0.25 microfarad, to the control grid of valve 31. This grid is biassed through resistor 37 of 1 megohm, from a tapping in the cathode load, which itself comprises resistors 38 and 39 of 560 ohms and 3 kilohms respectively. Owing to negative feedback introduced by this cathode load, the time-constant of the coupling is very much increased beyond that of condenser 36 and grid leak 37 alone which is 0.25 second and equal to the periodicity of four cycles per second oscillation, with the result that input voltage components of low frequency are satisfactorily amplified.

Valve 31 has an anode load comprising resistor 40 of 20 kilohms and potentiometer 41 of 10 kilohms. Impedance 45 represents the impedance of the high tension source, and is common to the anode and screen current supplies of both valves. The required output voltage is developed across utilization circuit 43, the impedance of which is represented by parallel resistor 44, and has the value 2 megohms. Coupling condenser 42 of 0.25 microfarad eliminates the direct component from the output voltage.

During the initial setting-up of the circuit, an alternating voltage (say, a 50-cycle voltage) is injected into the high tension line between the high tension source and the upper ends of resistors 34 and 41. The control grid of valve 30 is temporarily earthed, and the slider of potentiometer 41 is then adjusted until minimum alternating voltage output is obtained across circuit 43. The amplifier comprising valve 31 will then be giving approximately unity gain at the slider of potentiometer 41.

I claim:

1. A circuit comprising a first input circuit terminal whose potential varies relatively to a point of fixed potential, a second input circuit terminal whose potential also varies relatively to said point of fixed potential, an amplifier having two input terminals, means connecting said first input circuit terminal to one input terminal of said amplifier by a path exclusive of said second input circuit terminal, the other input terminal of the amplifier being connected to said point of fixed potential, an impedance element connecting the output of said amplifier to said second input circuit terminal by a path exclusive of said first input circuit terminal, and an output terminal connected to said impedance element at a point where the gain of said amplifier is approximately unity, whereby there appears between said output terminal and said point of fixed potential a potential difference substantially equal to the difference between the potentials of said input circuit terminals.

2. A circuit comprising a first input circuit terminal whose potential varies relatively to a point of fixed potential, a second input circuit terminal whose potential also varies relatively to said point of fixed potential, a resistor connected between said input circuit terminals, an amplifier having two input terminals, means connecting said first input circuit terminal to one input terminal of the amplifier by a path exclusive of said resistor, the other input terminal of the amplifier being connected to said point of fixed potential, a potentiometer whose resistance element is connected between the output of the amplifier and said second input circuit terminal by a path exclusive of said resistor, and an output terminal connected to the wiper of said potentiometer, whereby when said wiper is set for unity gain of said amplifier, the potential between said output terminal and said point of fixed potential is substantially equal to the difference between the potentials of said input circuit terminals.

3. A circuit comprising a source of potential difference, at least the alternating component of which is to be reproduced, said source having two terminals both at independently variable potential with respect to a point of steady potential; a first impedance connected between one of said source terminals and said point of steady potential; an amplifier with a gain exceeding unity and comprising a thermionic amplifier tube having a control grid coupled to the second of said source terminals by a path exclusive of said one of said source terminals, and having an anode connected through an anode load to a source of high tension current and a cathode connected to said point of steady potential, a feedback path connected from said anode to said one of said source terminals by a path exclusive of said second of said source terminals, said feedback path comprising a second impedance of large value relative to said first impedance, a tapping at a point in said second impedance where the gain of said amplifier is $A/(A+1)$, where A is the effective gain of said tube, and an output terminal for said circuit connected to said tapping.

4. A circuit comprising two sources of varying voltage, each of which has one terminal connected to a point of steady potential, and having means for combining the voltages from said sources and for yielding the result between an output terminal of said circuit and said point of steady potential, said means including a resistor interconnecting the variable-potential terminals of said sources, a phase-reversing amplifier having two input terminals one of which is connected to said point of steady potential, and the other connected to one end of said resistor by a path exclusive of said resistor, a voltage divider of high resistance relative to said resistor, the voltage divider being connected between the variable-potential output terminal of said amplifier and the other end of said resistor by a path exclusive of said resistor, and a connection to said voltage divider approximately at the unity-gain point, said connection constituting said output terminal of said circuit.

5. A circuit comprising two supply terminals, the potentials of which are independently variable with respect to a point of steady potential, two output terminals one of which is connected to said point of steady potential, and means for yielding a voltage between the output terminals approximating the potential difference between said supply terminals, the said means comprising a phase-inverting network having a voltage transformation ratio approximating unity and having a pair of input terminals and a pair of output terminals, a connection between said point of steady potential and one of said input pair of network terminals, the remaining one of said input pair of network terminals being connected to one of said supply terminals by a path exclusive of the other of said supply terminals one of said output pair of network terminals being connected to the remaining supply terminal by a path exclusive of said one of said supply terminals, and the other of said output pair of network terminals constituting the other of said circuit output terminals.

6. A circuit comprising a pair of supply terminals both of which may vary independently with respect to a steady potential terminal, a pair of output terminals one of which is connected to said steady potential terminal, and means for providing a voltage between said pair of output terminals approximating the voltage difference between said supply terminals, said means comprising a phase-inversion amplifier having a pair of input terminals one of which is connected to said steady potential terminal and the other of which is connected to one of said supply terminals by a path exclusive of the other of said supply terminals, said amplifier having a voltage divider connected from its variable potential output terminal to said other supply terminal by a path exclusive of said one of said supply terminals, and a tap on said divider approximately at the unity-gain point of the amplifier to constitute the other of said circuit-output terminals.

7. A circuit comprising two sources of potential each of which has one terminal connected to a point of steady potential and means for combining two voltages from said sources for yielding the resultant between an output terminal and a point of steady potential, said means comprising a phase-reversing network of substantially unity gain having an input terminal connected to a point of steady potential and another input terminal connected to the variable-potential terminal of one of said sources by a path exclusive of the variable potential terminal of the other of said sources, and a pair of output terminals for said network, one of said output terminals being connected to the first said point of steady potential, and the other of said output terminals being connected to the variable-potential terminal of said other of said sources by a path exclusive of the variable-potential terminal of said one of said sources.

LIONEL JOFEH.

REFERENCES CITED

The following references are of record in the file of this patent:

UNITED STATES PATENTS

| Number | Name | Date |
|---|---|---|
| 2,190,743 | Vance | Feb. 20, 1940 |
| 2,210,956 | Skillman | Aug. 13, 1940 |
| 2,241,595 | Guanella | May 13, 1941 |
| 2,252,007 | Jacobsen et al. | Aug. 12, 1941 |
| 2,401,779 | Swartzel | June 11, 1946 |

FOREIGN PATENTS

| Number | Country | Date |
|---|---|---|
| 506,659 | Great Britain | June 1, 1939 |